(12) United States Patent
Synnott et al.

(10) Patent No.: US 10,633,992 B2
(45) Date of Patent: Apr. 28, 2020

(54) RIM SEAL (71) Applicant: PRATT & WHITNEY CANADA CORP., Longueuil (CA)

(72) Inventors: Remy Synnott, St-Jean-sur-Richelieu (CA); John Pietrobon, Outremont (CA); Franco Di Paola, Montreal (CA); Lorenzo Sanzari, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 202 days.

(21) Appl. No.: 15/453,234

(22) Filed: Mar. 8, 2017

(65) Prior Publication Data
US 2018/0258781 A1 Sep. 13, 2018

(51) Int. Cl.
*F01D 11/00* (2006.01)
*F01D 11/02* (2006.01)

(52) U.S. Cl.
CPC ............ *F01D 11/001* (2013.01); *F01D 11/02* (2013.01)

(58) Field of Classification Search
CPC .............................. F01D 11/001; F01D 11/02
See application file for complete search history.

(56) References Cited

U.S. PATENT DOCUMENTS

| | | | |
|---|---|---|---|
| 2,564,503 A | 8/1951 | Rice | |
| 3,023,998 A | 3/1962 | Sanderson, Jr. | |
| 3,146,938 A | 9/1964 | Smith | |
| 3,262,635 A | 7/1966 | Smuland | |
| 3,606,349 A | 9/1971 | Petrie et al. | |
| 3,755,870 A | 9/1973 | Young et al. | |
| 3,761,200 A | 9/1973 | Gardiner | |
| 3,841,792 A * | 10/1974 | Amos | F01D 5/3007 415/173.7 |
| 3,908,361 A | 9/1975 | Gardiner | |
| 3,918,925 A | 11/1975 | McComas | |
| 4,084,919 A | 4/1978 | Morris, Jr. et al. | |
| 4,309,145 A | 1/1982 | Viola | |
| 4,320,903 A | 3/1982 | Ayache et al. | |
| 4,415,309 A | 11/1983 | Atterbury | |
| 4,747,750 A | 5/1988 | Chlus et al. | |
| 4,813,848 A | 3/1989 | Novotny | |
| 4,867,639 A | 9/1989 | Strangman | |
| 5,217,348 A | 6/1993 | Rup, Jr. et al. | |
| 5,228,195 A | 7/1993 | Brown et al. | |
| 5,362,204 A | 11/1994 | Matyscak et al. | |
| 5,522,698 A | 6/1996 | Butler et al. | |
| 5,575,486 A | 11/1996 | Edling et al. | |
| 5,601,404 A | 2/1997 | Collins | |
| 5,785,492 A | 7/1998 | Belsom et al. | |
| 5,967,745 A | 10/1999 | Tomita et al. | |
| 6,077,034 A | 6/2000 | Tomita et al. | |
| 6,152,690 A | 11/2000 | Tomita et al. | |
| 6,189,891 B1 | 2/2001 | Tomita et al. | |
| 6,220,815 B1 | 4/2001 | Rainous et al. | |
| 6,692,227 B2 | 2/2004 | Tomita et al. | |

(Continued)

*Primary Examiner* — Bryan M Lettman
(74) *Attorney, Agent, or Firm* — Norton Rose Fulbright Canada LLP (57) ABSTRACT

A rim seal located between a stator and a rotor in a gas turbine engine includes an axial overlap between platform rims of the stator and the rotor. The axial length of the platform rim of one of the stator and the rotor is accommodated within a radially aligned trench defined in the other of the stator and the rotor.

14 Claims, 5 Drawing Sheets

(56) References Cited

U.S. PATENT DOCUMENTS

| | | |
|---|---|---|
| 6,776,573 B2 | 8/2004 | Arilla et al. |
| 6,837,676 B2 | 1/2005 | Yuri et al. |
| 6,887,039 B2 | 5/2005 | Soechting et al. |
| 6,899,339 B2 | 5/2005 | Sanders et al. |
| 7,040,857 B2 | 5/2006 | Chiu et al. |
| 7,121,791 B2 | 10/2006 | Friedl et al. |
| 8,172,514 B2 | 5/2012 | Durocher et al. |
| 9,181,816 B2 | 11/2015 | Lee et al. |
| 9,341,078 B2 | 5/2016 | Davis |
| 2006/0045732 A1 | 3/2006 | Durocher et al. |
| 2006/0277922 A1 | 12/2006 | Durocher et al. |
| 2008/0061515 A1 | 3/2008 | Durocher et al. |
| 2009/0028712 A1 | 1/2009 | Weidmann et al. |
| 2014/0286777 A1 | 9/2014 | Gimel et al. |
| 2016/0130968 A1* | 5/2016 | Aggarwala ........... F01D 11/001 415/168.2 |
| 2017/0051621 A1* | 2/2017 | Ackermann ............ F01D 5/087 |

* cited by examiner

RIM SEAL

TECHNICAL FIELD

The application relates generally to gas turbine engines and, more particularly, to a rim seal between a bladed rotor and an adjacent non-rotating structure in gas turbine engines.

BACKGROUND

Compressors and turbines of a gas turbine engine generally have a plurality of stators and rotors in sequential disposition along a rotational axis. The rotating elements, such as compressor rotors and turbine rotors, operate at a very high rotation speed, and are mounted adjacent to and/or between non-rotating structures, such as stators, within the engine. These non-rotating structures are designed to be as close as possible to the rotating blade platforms, in order to mitigate pressurized gas ingestion inside the gas turbine engine. Typically, a rim seal arrangement is provided between the blade platforms of the rotor and the adjacent non-rotating structure in order to further limit losses from the main gas path.

Various rim seal arrangements between the rotating elements, e.g. compressor rotors and turbine rotors, and their adjacent non-rotating structures, e.g. stator assemblies, have been used in the past. However, in some cases the axial space envelope of the engine is limited. The rotors may therefore not be axially positioned closer to their adjacent stators than a minimum threshold distance, due to clearance limitations imposed by the overall tolerance stack-up.

Improved rim seal arrangements are therefore sought.

SUMMARY

There is accordingly provided a rim seal arrangement for a gas turbine engine comprising: a rotor having a rotor disk adapted to rotate about a longitudinal axis and a plurality of rotor blades circumferentially spaced apart about the rotor disk, the rotor disk defining an axial centerline plane at a midpoint between opposed upstream and downstream faces of the rotor disk at a radial outer rim of the rotor disk, each of the rotor blades including a rotor platform mounted to the rotor disk and an airfoil extending radially from the rotor platform to project within a main gas path of the gas turbine engine; a stator disposed adjacent to and axially spaced apart from the rotor, the stator including a plurality of vanes radially extending through the main gas path between a stator platform at a radially inner end and an outer shroud at a radially outer end; each of the rotor platforms including a rotor flange projecting axially toward the stator and abutting the rotor flange of a circumferentially adjacent rotor platform to form an annular rotor rim extending circumferentially around the longitudinal axis; each of the stator platforms having a stator flange projecting axially toward the rotor and abutting the stator flange of a circumferentially adjacent stator platform to form an annular stator rim extending circumferentially around the longitudinal axis, the annular stator rim being radially offset from the annular rotor rim by a radial gap distance, and the annular stator rim and the annular rotor rim axially overlapping each other by an axial overlap distance; and a trench defined in the rotor platform in radial alignment with the annular stator rim, the trench extending axially into the rotor platform to define an axial depth between a base of the trench and an axially outer surface of the rotor platform, the base of the trench being axially closer to the axial centerline plane of rotor disk than are the upstream and downstream faces of the rotor disk.

There is also provided a rim seal arrangement for a gas turbine engine, comprising: a rotor including a set of rotating blades having blade platforms mounted to a rotor disk, a non-rotating structure disposed adjacent to and downstream of the rotor and axially spaced apart therefrom to define an annular space between the blade platforms and the adjacent non-rotating structure, and a rim seal formed between the non-rotating structure and the blade platforms of the rotor and extending through the annular space, the rim seal including an annular rotor rim extending downstream from the blade platforms towards the non-rotating structure and an annular static rim extending axially upstream from the non-rotating structure towards the rotor, the annular rotor rim being radially offset from the annular static rim by a radial gap distance, and the annular static rim and the annular rotor rim axially overlapping each other by an axial overlap distance, and a trench defined in the blade platforms adjacent to and in radial alignment with the annular static rim, the trench extending axially upstream into the blade platforms to define an axial depth, a base of the trench in the blade platforms being further upstream than a downstream face of the rotor disk at a radially outer rim thereof.

There is further provided a method of improving a rim seal between a rotor and a stator in a turbine of a gas turbine engine, the stator being axially spaced apart from the rotor immediately downstream therefrom, the rotor including a set of turbine blades having blade platforms mounted to a rotor disk rotatable about a longitudinal axis, the method comprising: providing the rim seal between an annular rotor rim extending axially downstream from the blade platforms of the rotor and an annular stator rim extending axially upstream from the stator, the annular stator rim and the annular rotor rim axially overlapping each other by an axial overlap distance, and the annular stator rim and the annular rotor rim being radially offset by a radial gap distance; increasing the axial overlap distance by increasing an axial length of the annular stator rim; and forming a trench in the blade platforms of the rotor to accommodate the increased axial length of annular stator rim, the trench being radially aligned with the annular stator rim, the trench extending axially into the blade platforms to define an axial depth between a base of the trench and an axially outer surface of the blade platforms, the base of the trench being axially further upstream than a downstream face of the rotor disk at a radially outer rim thereof.

BRIEF DESCRIPTION OF THE DRAWINGS

Reference is now made to the accompanying figures in which:

FIG. 2b is an enlarged view of a portion of the cross-sectional view of FIG. 2a;

FIG. 3b is an enlarged view of a portion of the cross-sectional view of FIG. 3a.

All figures are for illustration purposes only.

DETAILED DESCRIPTION

Figure 1:
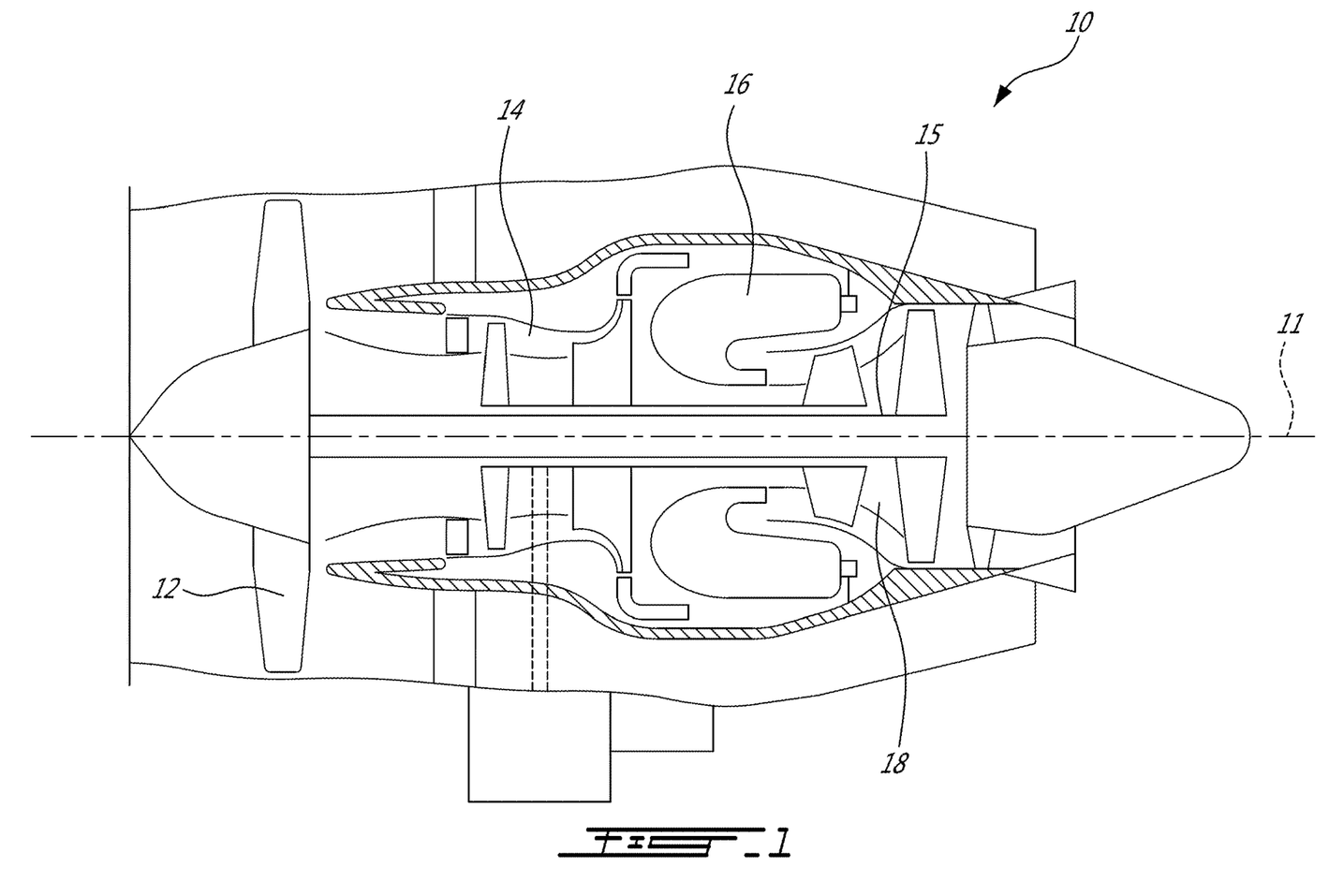
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor 14, and the turbine section 18 are mounted on at least one shaft 15.

Each of the compressor section 14 and the turbine section 18 includes rotating elements, namely compressor rotors and turbine rotors, and static or non-rotating structures, including compressor stators and turbine stators. A rim seal 45, as will be described herein, is disposed between one or more of these rotors and an adjacent non-rotating structure, such as a stator.

Figure 2A:
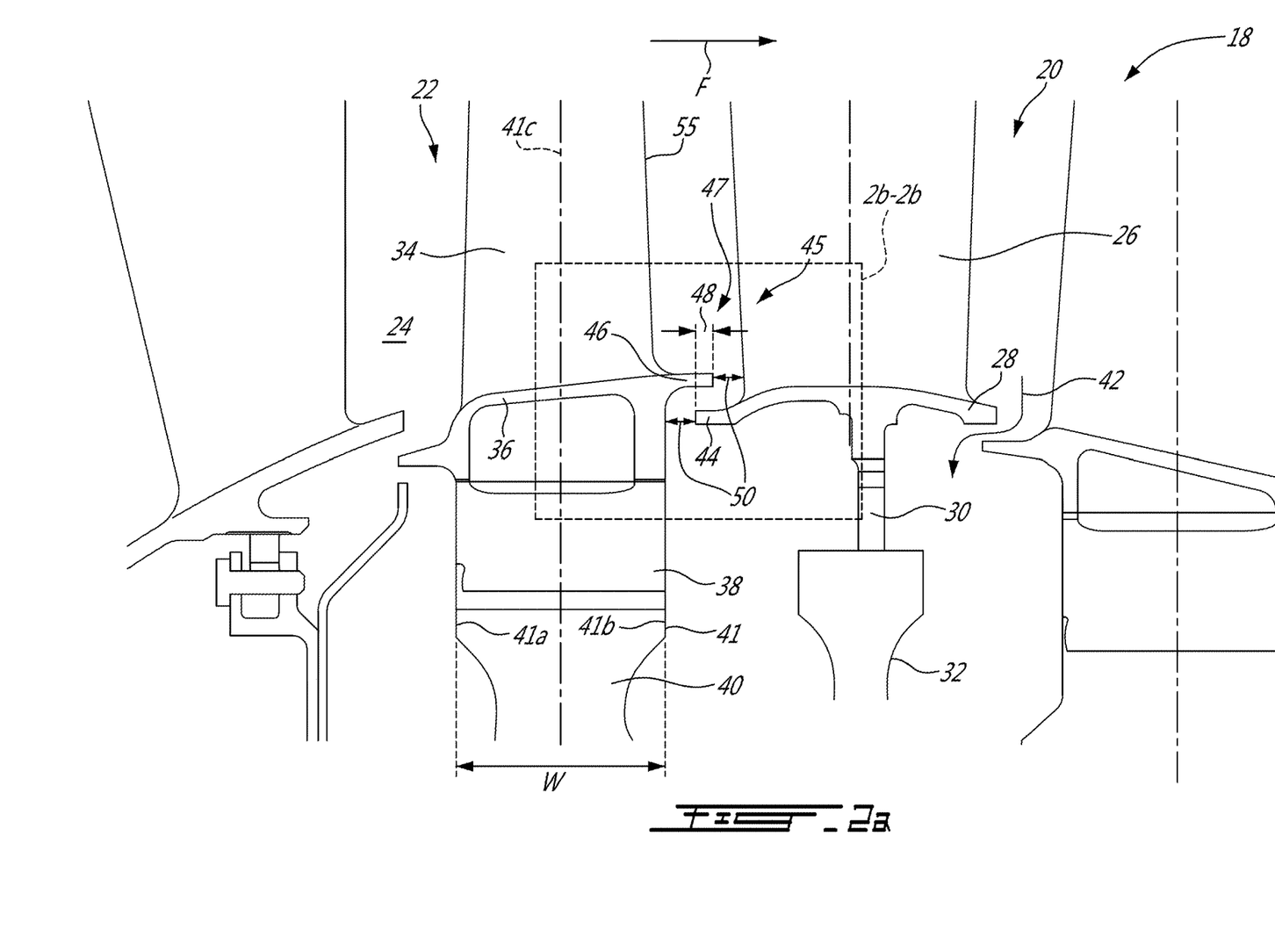
FIG. 2a is a cross-sectional view of a portion of a turbine of the gas turbine engine of FIG. 1.

Now referring to FIG. 2a, in the illustrated embodiment, the turbine section 18 includes an axial turbine comprising a turbine rotor 22 and a turbine stator 20 disposed adjacent one another. The turbine section 18 of the engine 10 may in fact include a plurality of axial turbines, thereby resulting in a plurality of turbine rotors 22 and turbine stators 20 in alternating sequence along the longitudinal axis 11 of the engine 10. Alternately, however, the static or non-rotating structures can include structures other that stators with airfoils. For example, the non-rotating structures can include an inner wall of an interurban duct, for example in the case of a high pressure turbine stage, or the inner wall of an exhaust duct, for example in the case of the low pressure turbine stage 22.

It should be noted that the rim seal 45 as described herein is not limited for use with turbine rotors and blades. The rim seal can also be used on either sides of a compressor rotor.

Still referring to FIG. 2a, the stator 20 has a plurality of vane airfoils 26 extending radially through the main gas path 24 outwardly from respective inner platforms 28 located at radially inner ends and outer shrouds (not shown) located at radially outer ends, and a plurality of vane mounting sections 30 extending radially inwardly from the respective inner vane platforms 28. The vane mounting sections 30 are fastened to a central hub 32 of the stator 20. A rotor 22, which in the case of a turbine rotor 22 within the turbine section 18 of the engine 10 is immediately upstream from the turbine stator 20, has a plurality of rotor blades 34 extending radially outwardly from respective rotor platforms 36 which are mounted to the disk 40 of the rotor 22 by a plurality of blade roots 38 extending radially inwardly from the respective rotor platforms 36. The blade roots 38 are configured to be received within corresponding slots formed within the disk 40 of the rotor 22. In the depicted embodiment, the vane platforms 28 and the rotor platforms 36 are located at a radially inner end of the vane airfoils 26 and blades 34.

The rotor disk 40 defines a radial outer rim 41 axially extending between an upstream face 41a and an opposed downstream face 41b. The rotor disk defines an axial centerline 41c located at a mid-plane between the rotor disk outer rim upstream and downstream faces 41a and 41b. An axial distance between the upstream 41a and downstream 41b faces defines a width W of the rotor disk outer rim 41.

In the embodiment shown, the platforms 28 of the stator 20 are in abutment engagement with one another to define a circumferential stator flange 44 circumferentially extending around the axis 11. The stator flange 44 extends axially away (e.g. upstream) toward the rotor 22. Similarly, the platforms 36 of the rotor 22 are in abutment engagement with one another to define a circumferential rotor flange 46 circumferentially extending around the axis 11. The rotor flange 46 extends axially away (e.g. downstream) toward the stator 20. The stator and rotor flanges 44 and 46 each define a continuous annular rim circumferentially extending around the axis 11.

Figure 2B:
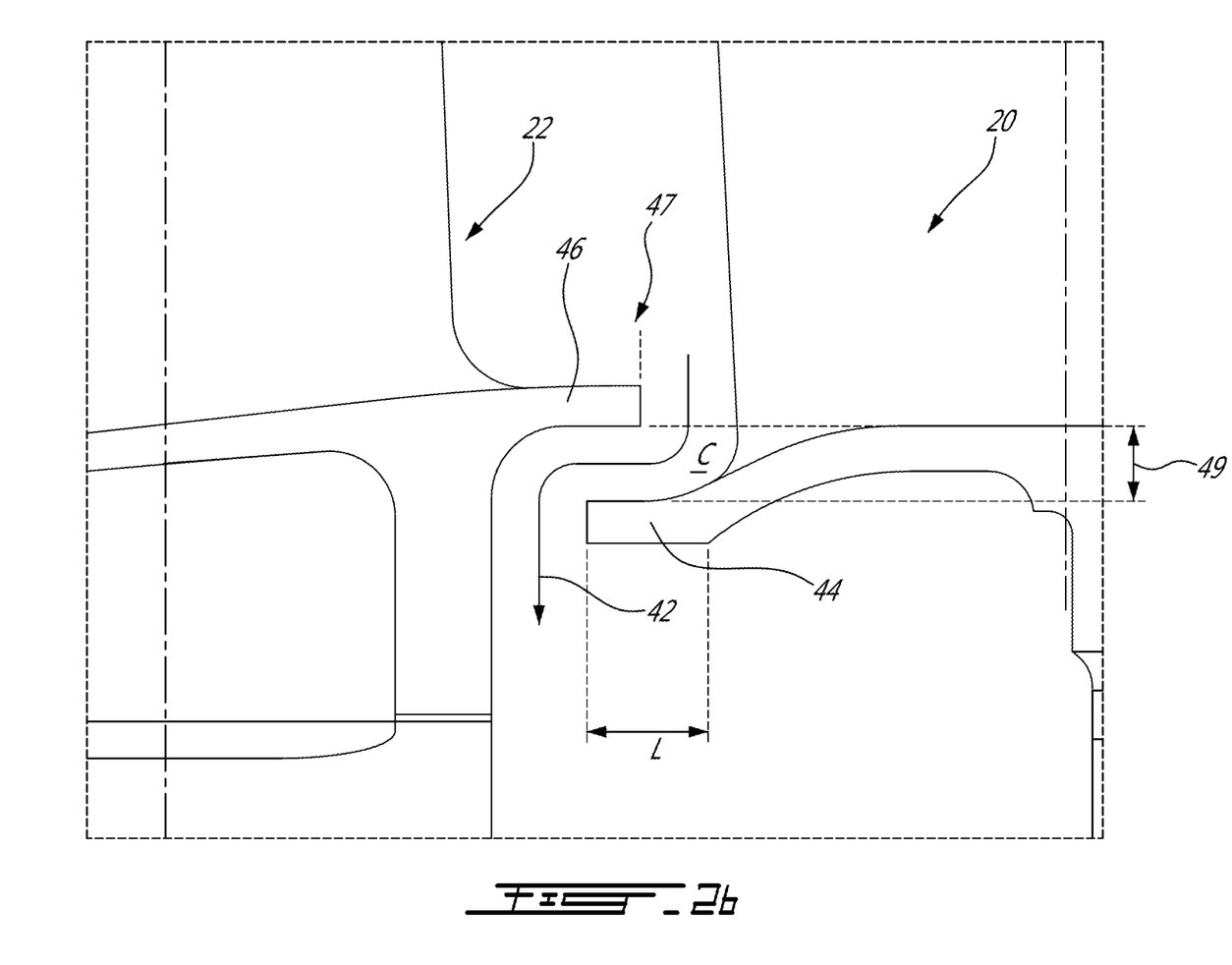

Referring also to FIG. 2b, the stator flange 44 rotates relative to the rotor flange 46. During operation, a portion of the exhaust gases might leak from the annular gas path 24 in a radially inward direction represented by arrow 42, between the rotor 22 and the downstream stator 20. Such leaks might negatively impair performance because the turbine section 18 is unable to extract energy from the portion of the exhaust gases that leaks out of the annular main gas path 24.

Still referring to FIGS. 2a and 2b, a rim seal 45 arrangement is provided between the rotor 22 and the stator 20. More particularly, the rim seal arrangement 45 is formed at least partially by the stator and rotor flanges 44 and 46, which are radially offset from each other but which axially overlap each other by a predetermined axial distance to define an axial overlap 47. The axial overlap 47 is defined by an axial distance 48, parallel to the axis 11 between extremities, or remote ends, of the overlapping flanges 44 and 46. The overlap 47 creates an air conduit C having a sinuous shape such as to offer a greater air resistance compared to a configuration without overlap. In the illustrated embodiment, the exhaust gases flow in the annular gas path 24 in a direction represented by arrow F. In the embodiment shown, the rotor 22 is upstream to the stator 20 relative to the flow direction F and the rotor flange 46 is radially outward relative to the stator flange 44. The rotor annular rim defined by the rotor platforms 46 is radially offset by a radial gap distance 49 from the stator annular rim defined by the stator platforms 44. Accordingly, an exhaust gas leak that enters in the air conduit C circulates in opposite direction relative to the exhaust gases direction F in a portion of the conduit C. However, it may be possible to dispose the stator flange 44 radially outward relative to the rotor flange 46.

In a particular embodiment, heat in the turbine section 18 might cause thermal growth of the different parts of the turbine section 18 (e.g., stators/non-rotating or static structures 20 and rotors 22). In some cases, the axial distance 48 of the overlap 47 might decrease when the engine 10 is in operation compared with the engine at rest. The "cold" overlap is greater than the "hot" overlap. In operating conditions, the conduit C thus has a less sinuous, straighter shape. Hence, efficiency of the rim seal 45 may become reduced. For the remainder of this description, the overlap 47 refers to the "cold" overlap unless otherwise indicated.

The axial distances 50 between the stator flange 44 and the rotor platform 36 and between the rotor flange 46 and the stator vane airfoil 26 over the axial length L of the stator flange 44 are dictated by the tolerance stack up of all components of the turbine section 18. Hence, increasing an axial length L of the flanges 44 and/or 46 might lead to friction between different parts of the stators 20 and of the rotors 22.

Figure 3A:
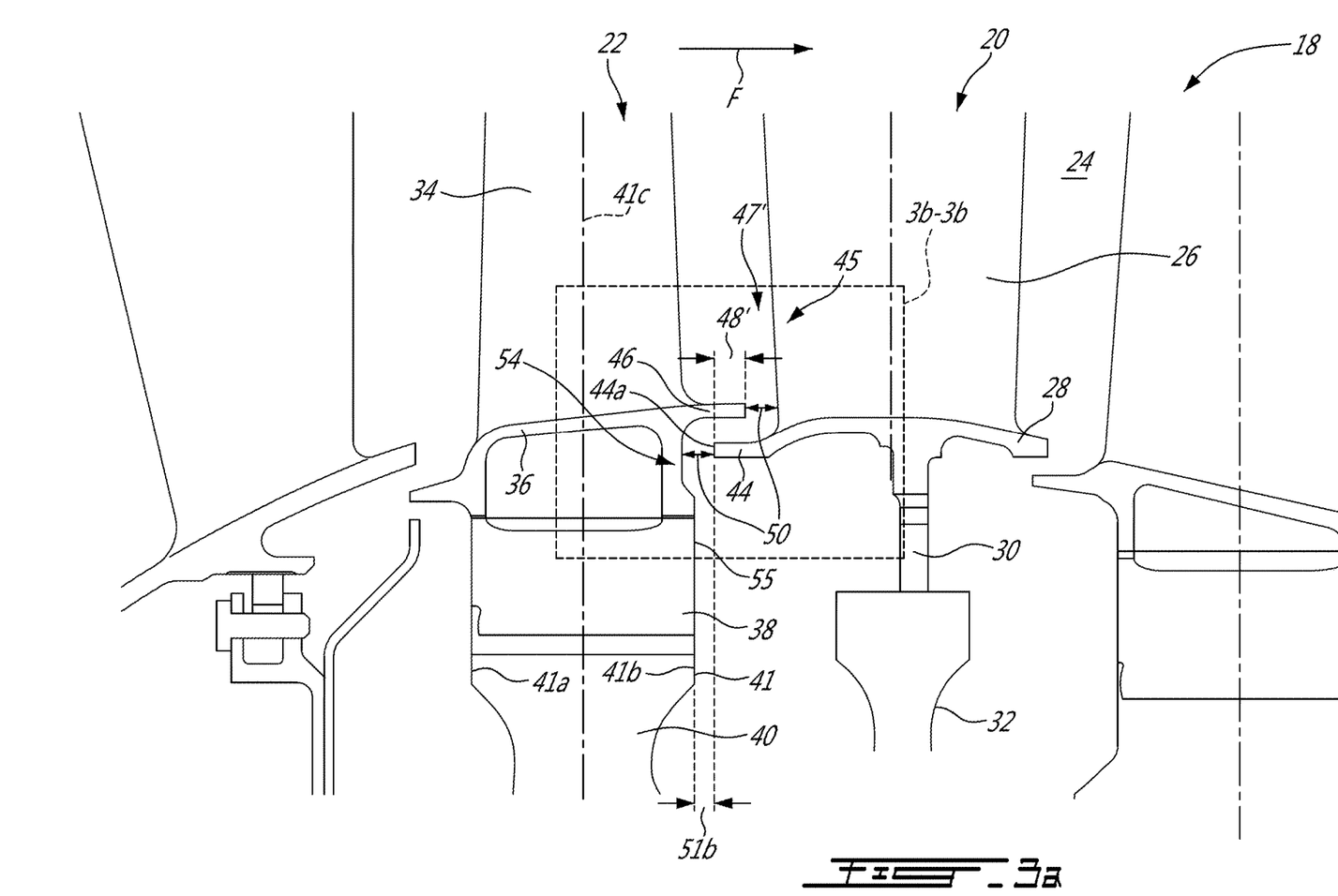
FIG. 3a is another cross-sectional view of a portion of a turbine of the gas turbine engine of FIG. 1.
Figure 3B:
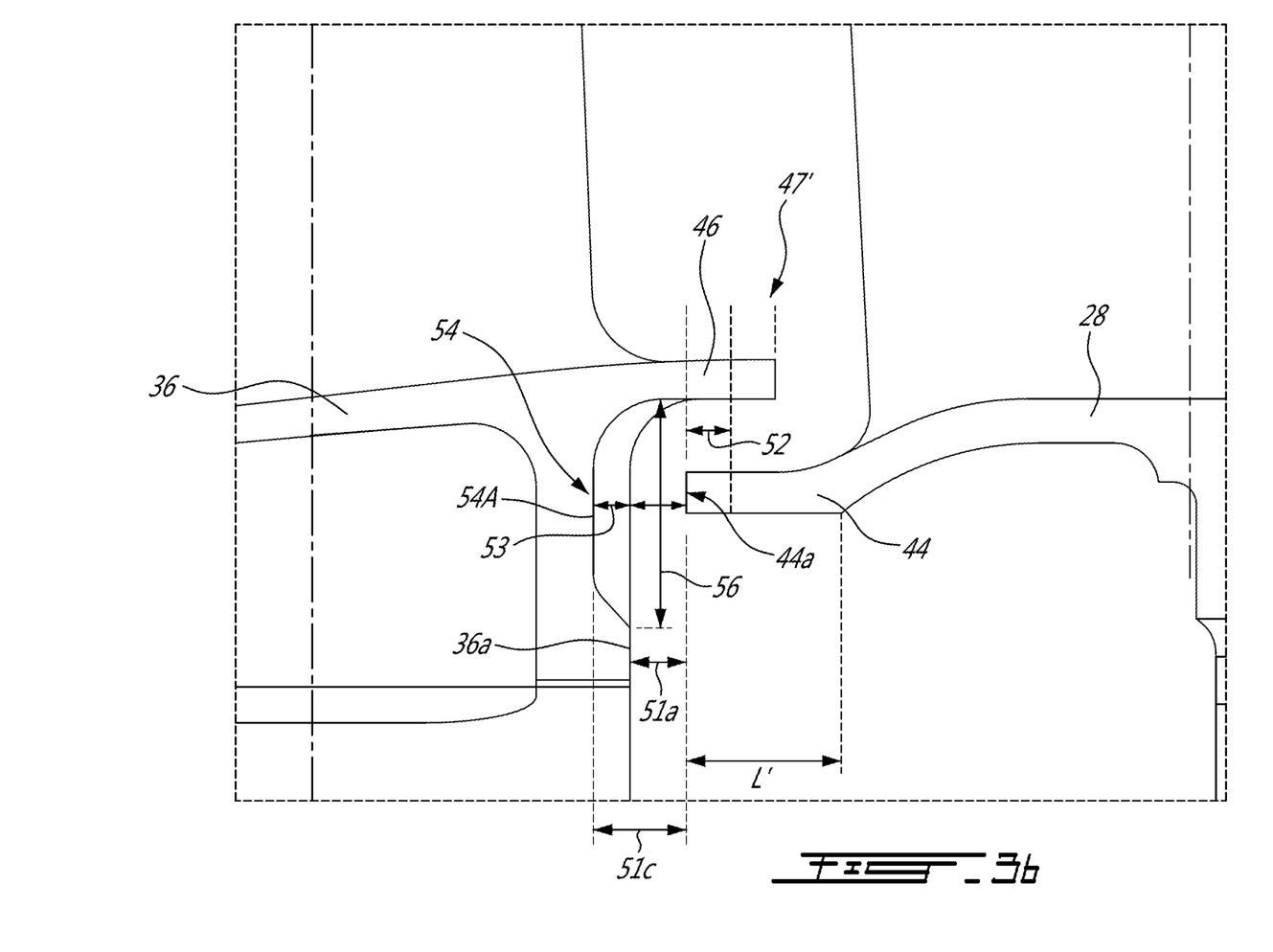

Now referring to FIGS. 3a and 3b, the rim seal arrangement 45 is modified by increasing the overlap 48 between the stator flange 44 and the rotor flange 46 while keeping the distances 50 substantially constant. In a particular embodiment, the overlap 47' is increased by increasing an axial length of the stator annular rim flange 44. To accommodate a length increase 52 of the stator flange 44, an annular trench 54 is formed in the rotor platform 36 at a location that is radially aligned with the stator platform annular rim 44. The trench 54 is formed radially inwardly relative to the rotor flange 46 and radially outwardly relative to the rotor blade root 38. In the illustrated embodiment, the trench 54 is formed in a downstream surface 55 of the rotor 22. The rotor trench 54 may be formed in one or more of the rotor blade platforms 36, the blade roots 38 and/or the rotor disk 40.

In the embodiment shown, the rotor trench 54 is provided in the form of an annular groove circumferentially extending around the axis 11. An axial depth 53 of the rotor trench 54 relative to the axis 11 corresponds to the length increase 52 of the stator flange 44. The trench axial depth 53 is defined between a base of the trench 54a and an axially outer surface 36a of the rotor platform 36. The trench base 54a is located axially further upstream than a downstream face 41b of the rotor disk outer rim 41. However, the depth 53 may be equal to or greater than the length increase 52 of the stator flange 44. The base 54a of the trench 54 is closer to the rotor disk axial centerline 41c than are the rotor disk outer rim upstream and downstream faces 41a and 41b. In a particular embodiment, the stator flange 44 is radially aligned relative to a radial length 56 of the rotor trench 54 to allow radial thermal displacement of the stator flange 44 relative to the rotor trench 54. The stator flange 44 may be radially centered relative to the rotor trench 54.

In the embodiment shown, the axial overlap distance 48' is greater than the trench axial depth 53. In a particular embodiment, the axial overlap distance 48' is greater than an axial distance 51a between a remote end 44a of the stator rim 44 and the axially outer surface 36a of the rotor platform 36. In a particular embodiment, the axial overlap distance 48' is greater than an axial distance 51b between the stator rim remote end 44a and a closest one of the upstream and downstream faces 41a and 41b of the rotor disk outer rim 41. In a particular embodiment, the axial overlap distance 48' is greater than an axial distance 51c between the stator rim remote end 44a and the base of the trench 54a.

In a particular embodiment, the rim seal arrangement is improved by providing a ratio of the axial overlap distance 48' to the radial gap distance 49 equal to or greater than 1. In a particular embodiment, to improve the rim seal arrangement, the trench axial depth 53 is made less than the axial overlap distance 48'.

In a particular embodiment, an existing gas turbine engine 10 might be retrofit by forming the trench 54 in an existing rotor 22. The forming of the trench 54 may be carried by a machining process. The trench 54 is formed until its base is located further closer to the mid-plane 41c of the rotor disk outer rim 41 than are the upstream and downstream faces 41a and 41b of the rotor disk outer rim 41. Others processes may be used without departing from the scope of the present disclose. Alternatively, the rotor 22 may be replaced by a new rotor already comprising the trench 54. In the depicted embodiment, the rotor 22 comprises a plurality of blades 34 and respective blade roots 38 both radially extending from the platforms 36. Hence, trenches 54 are formed on all of the rotor platforms 36 radially inwardly relative to the rotor flanges 46 and radially outwardly relative to the blade roots 38 of the rotor 22. In a particular embodiment, retrofitting the engine 10 comprises increasing the axial overlap distance 48' such that it is greater than an axial distance between the stator flange remote end 44a and at least one of the rotor platform axially outer surface 36a, a closest one of the rotor disk outer rim upstream and downstream faces 41a/41b, and the trench base 54a. In a particular embodiment, retrofitting the engine 10 comprises increasing the axial overlap distance 48' such that a ratio of the overlap distance 48' to the radial gap 49 is equal to or greater than 1.

In a particular embodiment, the length of the stator flange 44 is increased by adding material to the stator platform 28 using a process such as, but not limited to, brazing and soldering. Alternatively, the stator 20 may be replaced by a new stator having vanes with the elongated flanges 44. In the depicted embodiment, the stator 20 comprises a plurality of vanes 26 and respective mounting sections 30 both radially extending from the platforms 28. Hence, the stator flanges 44 of all the platforms 28 are elongated.

In a particular embodiment, the rim seal arrangement 45 is created by disposing the rotor disk 40 on the engine shaft 15 coincident with the axis 11. Then, the stator hub 32 is also disposed on the engine shaft 15 until the stator platform 28 at least partially overlaps the rotor platform 36 an axial distance 48. Then, the axial distance 48 is increased to 48' by moving the stator 20 such that the stator flange 44 is moved toward the rotor trench 54 until the axial distance 48' is greater than an axial distance between the stator flange remote end 44a and at least one of the rotor platform axially outer surface 36a, a closest one of the rotor disk outer rim upstream and downstream faces 41a/41b, and the trench based 54a. In a particular embodiment, the rim seal arrangement is created by having the axial overlap distance 48' greater than the radial gap 49 such that a ratio of the overlap distance 48' to the radial gap 49 is equal to or greater than 1. The new overlap 48' is greater than the former overlap 48 by the length increase 52. The present disclosure is not limited by the order of assembly described herein.

Although the above description is directed to the turbine 18 of a gas turbine engine 10, it may be applicable to the gas turbine engine compressor 14. The trench is not necessarily defined in the rotor 22 and may be defined in the stator 20. In another embodiment, both the rotor and the stator define trenches to accommodate the elongated flanges of the stator and the rotor. In this other embodiment, a trench has to be defined in a blade/airfoil vane of the rotor/stator.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A rim seal arrangement for a gas turbine engine comprising:
   a rotor having a rotor disk adapted to rotate about a longitudinal axis and a plurality of rotor blades located radially outwardly of the rotor disk and being circumferentially spaced apart about the rotor disk, the rotor disk defining an axial centerline plane at a midpoint between opposed upstream and downstream faces of the rotor disk at a radial outer rim of the rotor disk, each of the rotor blades including a rotor platform mounted to the rotor disk and an airfoil extending radially from the rotor platform to project within a main gas path of the gas turbine engine;
   a stator disposed adjacent to and axially spaced apart from the rotor, the stator including a plurality of vanes radially extending through the main gas path between a stator platform at a radially inner end and an outer shroud at a radially outer end;
   each of the rotor platforms including a rotor flange projecting axially toward the stator and abutting a rotor flange of a circumferentially adjacent rotor platform to form an annular rotor rim extending circumferentially around the longitudinal axis;

each of the stator platforms having a stator flange projecting axially toward the rotor and abutting a stator flange of a circumferentially adjacent stator platform to form an annular stator rim extending circumferentially around the longitudinal axis, the annular stator rim being radially offset from the annular rotor rim by a radial gap distance, and the annular stator rim and the annular rotor rim axially overlapping each other by an axial overlap distance; and a trench defined in the rotor platform in radial alignment with the annular stator rim, the trench extending axially into the rotor platform to define an axial depth between a base of the trench and an axially outer surface of the rotor platform, the base of the trench being axially closer to the axial centerline plane of the rotor disk than are the upstream and downstream faces of the rotor disk.

2. The rim seal arrangement of claim 1, wherein the axial overlap distance is greater than or equal to the radial gap distance.

3. The rim seal arrangement of claim 2, wherein the axial overlap distance is equal to the radial gap.

4. The rim seal arrangement of claim 1, wherein the axial overlap distance is greater than the axial depth of the trench.

5. The rim seal arrangement of claim 1, wherein the axial overlap distance is greater than an axial distance between a remote end of the stator rim and the axially outer surface of the rotor platform.

6. The rim seal arrangement of claim 1, wherein the axial overlap distance is greater than an axial distance between a remote end of the stator rim and a closest one of the upstream and downstream faces of the rotor disk.

7. The rim seal arrangement of claim 1, wherein the axial overlap distance is greater than an axial distance between a remote end of the stator rim and the base of the trench.

8. A rim seal arrangement for a gas turbine engine, comprising: a rotor including a set of rotating blades having blade platforms mounted to a rotor disk, the rotating blades located radially outwardly of the rotor disk, a non-rotating structure disposed adjacent to and downstream of the rotor and axially spaced apart therefrom to define an annular space between the blade platforms and the adjacent non-rotating structure, and a rim seal formed between the non-rotating structure and the blade platforms of the rotor and extending through the annular space, the rim seal including an annular rotor rim extending downstream from the blade platforms towards the non-rotating structure and an annular static rim extending axially upstream from the non-rotating structure towards the rotor, the annular rotor rim being radially offset from the annular static rim by a radial gap distance, and the annular static rim and the annular rotor rim axially overlapping each other by an axial overlap distance, and a trench defined in the blade platforms adjacent to and in radial alignment with the annular static rim, the trench extending axially upstream into the blade platforms to define an axial depth, a base of the trench in the blade platforms being further upstream than a downstream face of the rotor disk at a radially outer rim thereof.

9. The rim seal arrangement of claim 8, wherein the rotor disk defines a disk width between the downstream face and an opposed upstream face at the radially outer rim of the rotor disk, an axial centerline plane of the rotor disk is located at a midpoint of the axial disk width, and the base of the trench is located axially closer to the axial centerline plane than the downstream face of the rotor disk.

10. The rim seal arrangement of claim 8, wherein the axial overlap distance is greater than or equal to the radial gap distance.

11. The rim seal arrangement of claim 8, wherein the axial overlap distance is greater than the axial depth.

12. The rim seal arrangement of claim 8, wherein the axial depth is defined between the base of the trench and an axially outer surface of the rotor platform, the axial overlap distance being greater than an axial distance between a remote end of the stator rim and the axially outer surface of the rotor platform.

13. The rim seal arrangement of claim 8, wherein the axial overlap distance is greater than an axial distance between a remote end of the stator rim and a closest one of the downstream face of the rotor disk and an upstream face of the rotor disk.

14. The rim seal arrangement of claim 8, wherein the axial overlap distance is greater than an axial distance between a remote end of the stator rim and the base of the trench.

* * * * *